United States Patent
Yufune (10) Patent No.: US 10,567,665 B2
(45) Date of Patent: Feb. 18, 2020

(54) DISPLAY CONTROL DEVICE AND DISPLAY CONTROL SYSTEM

(71) Applicant: JVC KENWOOD CORPORATION, Yokohama-shi, Kanagawa (JP)

(72) Inventor: Shuta Yufune, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 16/173,177

(22) Filed: Oct. 29, 2018

(65) Prior Publication Data

US 2019/0158751 A1     May 23, 2019

(30) Foreign Application Priority Data

Nov. 17, 2017 (JP) ................ 2017-221449

(51) Int. Cl.
*H04N 5/232* (2006.01)
*G06F 3/0484* (2013.01)
*H04N 5/357* (2011.01)

(52) U.S. Cl.
CPC ..... *H04N 5/23296* (2013.01); *G06F 3/04847* (2013.01); *H04N 5/23216* (2013.01); *H04N 5/23299* (2018.08); *H04N 5/3572* (2013.01)

(58) Field of Classification Search
CPC ............ H04N 5/23296; H04N 5/23216; G06F 3/04847
See application file for complete search history.

(56) References Cited

U.S. PATENT DOCUMENTS

| 6,396,946 | B1 | 5/2002 | Sogawa | |
|---|---|---|---|---|
| 6,768,563 | B1 * | 7/2004 | Murata | H04N 5/232 348/211.11 |
| 10,110,823 | B2 * | 10/2018 | Shigeta | G02B 15/14 |
| 2002/0051080 | A1 * | 5/2002 | Tanaka | H04N 5/232 348/552 |
| 2019/0149746 | A1 * | 5/2019 | Hyttinen | H04N 5/247 |
| 2019/0158751 | A1 * | 5/2019 | Yufune | H04N 5/23296 |

FOREIGN PATENT DOCUMENTS

JP        H11-211469 A        8/1999

* cited by examiner

*Primary Examiner* — Timothy J Henn
(74) *Attorney, Agent, or Firm* — Nath, Goldberg & Meyer; Jerald L. Meyer; Stanley N. Protigal (57) ABSTRACT

A display control device for controlling displaying of images taken by a plurality of cameras each having a function of changing a zoom magnification includes: an operation unit including an operation element provided for each of the cameras to accept an operator's operation of setting the zoom magnification of the cameras, the operation unit being configured to output a input pulse signal corresponding to an operation amount of the operation element; and a W/T pulse convertor configured to convert the input pulse signal to a reference pulse signal that is uniformized variations in the zoom magnification of respective cameras with respect to a predetermined operation amount of the operation element, and output the second control signal to a corresponding camera.

6 Claims, 6 Drawing Sheets

DISPLAY CONTROL DEVICE AND DISPLAY CONTROL SYSTEM

CROSS REFERENCE TO RELATED APPLICATION

The present application is based on, and claims priority from Japanese Patent Application No. 2017-221449; filed Nov. 17, 2017, the disclosure of which is hereby incorporated by reference herein in its entirety.

BACKGROUND

Technical Field

The present application relates to a display control device and a display control system, both of which are provided for controlling displaying of images taken by a plurality of cameras each having a zooming function.

Related Art

In a studio or live place, for example, an attempt is often made to take and display a plurality of images simultaneously with a plurality of cameras each having functions of panning (i.e. rotating an orientation of lenses of a camera in a horizontal direction), tilting (i.e. rotating the orientation of lens of a camera in a vertical direction) and zooming (i.e. changing the magnification of a camera in a range from telephoto up to wide angle). Here, these cameras having such functions will be referred to as "PTZ cameras" after. Such a displaying operation with several cameras is frequently manipulated by only one operator.

In operation, when one operator operates a plurality of PTZ cameras to set a display magnification and also produce an image, exclusive operation elements (e.g. rotary operation elements) are manipulated by the operator. Then, due to a difference in the model and/or manufacture of the cameras, there is a case that respective variations in the magnification of respective cameras with respect to an operation amount of each operation clement differ from each other. Suppose, for example, a situation that respective magnifications of two cameras are established by operating their respective operation elements. Under the situation, if changing respective meter readers of both operation elements by the same operation amount of "x", there may arise a possibility that the magnification of one camera changes with an amount of "y", while the magnification of the other camera changes with an amount of "z" different from "y".

In such a case, when setting the magnification of two cameras, it is difficult to produce an image where the magnification of the image has been changed according to an operator's will, because there is a difference in an operator's feeling against changing magnification between respective operation elements. Furthermore, if the number of cameras gets increased, an operator's feeling is further complicated to cause the operation to be difficult. Therefore, it is desired to unify the operability of respective operation elements in changing the displaying magnification of respective cameras, thereby improving the operability of respective operation elements.

Meanwhile, a camera itself has a problem of luminance unevenness (i.e. shading) caused by peripheral darkening of an optical system or inequality of sensitivity of an image pickup element and therefore, it is necessary to perform a shading correction to remove such shading. However, as the degrees of shading correction are different for the respective models of cameras, there arises a problem that obtained images are not made to be similar in quality. In Patent Literature 1 (U.S. Pat. No. 6,396,946 B1), there is described a technique of correcting an image taken by two cameras used for a stereo camera. However, Patent Literature 1 does not describe a technique of adjusting the quality of images of different types of cameras.

SUMMARY

As mentioned above, in the conventional display control device of Patent Literature 1, when controlling displaying of images taken by a plurality of cameras and if there is a difference in the model of the cameras, it is difficult for an operator to manipulate the zoom magnifications of the cameras. Additionally, if the model of cameras differs, it is difficult to uniformize image quality of images taken by respective cameras and therefore, there arises a problem of giving discomfort to a viewer, in a situation of displaying the images taken by the plurality of cameras on a single screen separately.

The present application is provided to solve such conventional problems, and it is therefore an object of the present application to provide a display control device and a display control system, both of which can facilitate an operator's manipulation of zoom magnification even if the models of a plurality of cameras are different from each other and which can display an image with image quality uniformized.

In order to attain the above object, according to a first aspect of the present application, a display control device for controlling displaying of images taken by a plurality of cameras each having a function of changing a zoom magnification includes: an operation unit including an operation element provided for each of the cameras to accept an operator's operation of setting the zoom magnification of the cameras, the operation unit being configured to output a control amount of a first control signal corresponding to an operation amount of the operation element; and a control amount convertor configured to convert the control amount of the first control signal to a control amount of a second control signal that is uniformized variations in the zoom magnification of respective cameras with respect to a predetermined operation amount of the operation element, and output the second control signal to a corresponding camera.

Additionally, according to a second aspect of the present application, a display control system includes: a plurality of cameras each having a function of changing a zoom magnification; and a display control device for controlling displaying of images taken by the cameras. Each of the cameras includes a zoom magnification changer. The display control device includes: an operation unit including an operation element provided for each of the cameras to accept an operator's operation of setting the zoom magnification of the cameras, the operation unit being configured to output a control amount of a first control signal corresponding to an operation amount of the operation element; and a control amount convertor configured to convert the control amount of the first control signal to a control amount of a second control signal that is uniformized variations in the zoom magnification of respective cameras with respect to a predetermined operation amount of the operation element, and output the second control signal to the zoom magnification changer. The zoom magnification changer is configured to change the zoom magnification corresponding to the control amount of the second control signal.

In the display control device according to the first aspect of the present application and the display control system according to the second aspect of the present application, as respective variations in the zoom magnification of the cameras with respect to a predetermined operation amount of the operation element manipulated by an operator coincide with each other, the operator is capable of controlling the zoom magnification of the cameras without an uncomfortable feeling.

DESCRIPTION OF EMBODIMENTS

An embodiment will be described with reference to the drawings.

Figure 1:
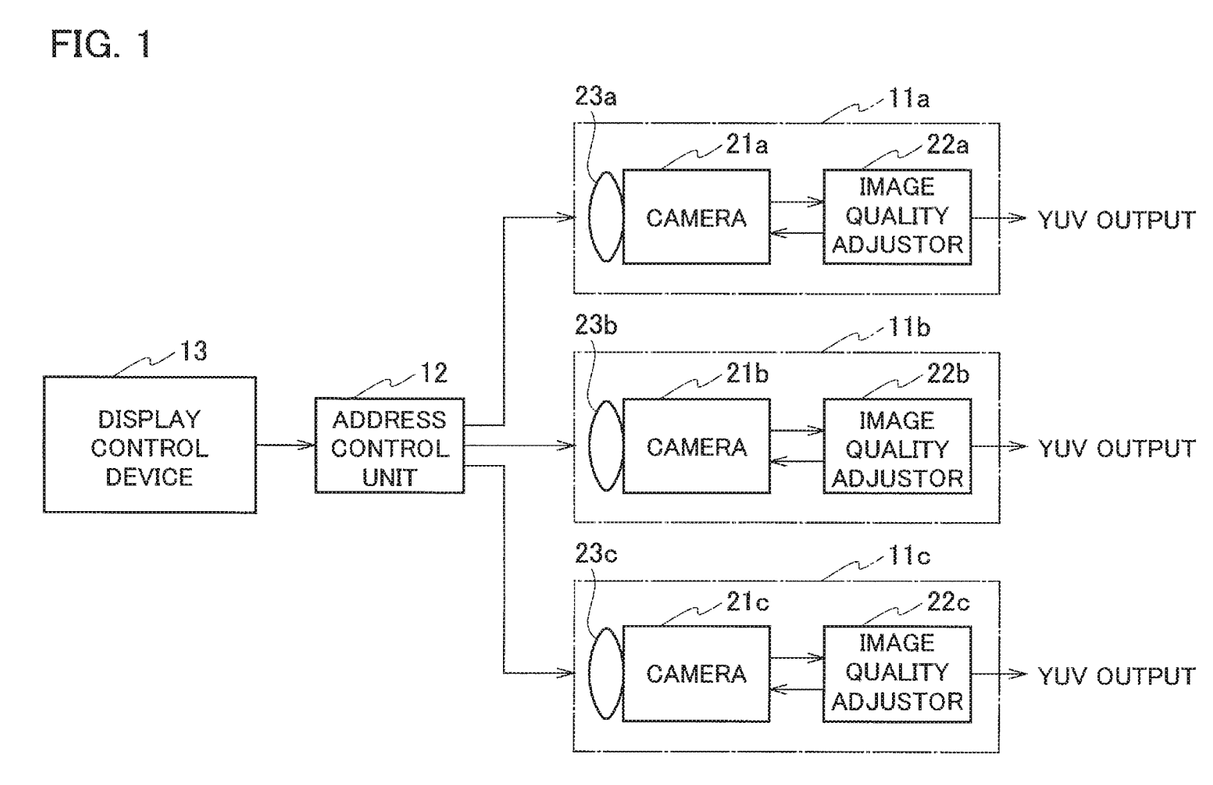
FIG. 1 is a block diagram illustrating a constitution of a display control system according to an embodiment.

As illustrated in FIG. 1, a display control system according to the embodiment includes a plurality of (three in FIG. 1) imaging devices 11a, 11b, 11c, an address control unit 12 connected to the respective imaging devices 11a, 11b, 11c, and a display control device 13. In the following description, if indicating each imaging device in distinction from others, the device will be represented with a suffix such as "11a", "11b" or "11c", and if the imaging device is indicated with no distinction, it will be represented with no suffix but "11" representatively. The same applies to other codes.

The imaging device 11a includes a camera 21a, an image quality adjustor 22a, and a lens 23a. Each of the imaging devices 11b, 11c also has the similar configuration and includes a camera 21b, 21c, an image quality adjustor 22b, 22c, and a lens 23b, 23c.

The camera 21 acquires an image focused by the lens 23 and converts it into image data. The camera 21 is provided with a motor (not illustrated) for its panning and tilting actions, and the angle of panning and the angle of tilting can be remotely controlled on the basis of a control signal transmitted from the display control device 13. The lens 23 of the camera 21 has a zooming function. By moving the lens 23 in the front-rear direction on the basis of the control signal transmitted from the display control device 13, the zoom magnification of the lens 23 can be changed to allow an image to be captured with a desired enlargement or reduction ratio.

According to the camera 21 having such functions, as the pan angle, the tilt angle, and the zoom magnification can be arbitrarily set with remote control by the display control device 13, it is possible to capture an image in a desired orientation, for example, in a studio or live show venue and also possible to capture an image in both zooming-up and zooming-back.

The address control unit 12 outputs the control signal to each of the imaging devices 11 as a destination, based on an IP address of the control signal outputted from the display control device 13. Owing to the control function of the address control unit 12, the control signals to be transmitted from the display control device 13 to the respective imaging devices 11 can be distributed and transmitted to the corresponding image capturing devices 11, respectively.

Figure 2:
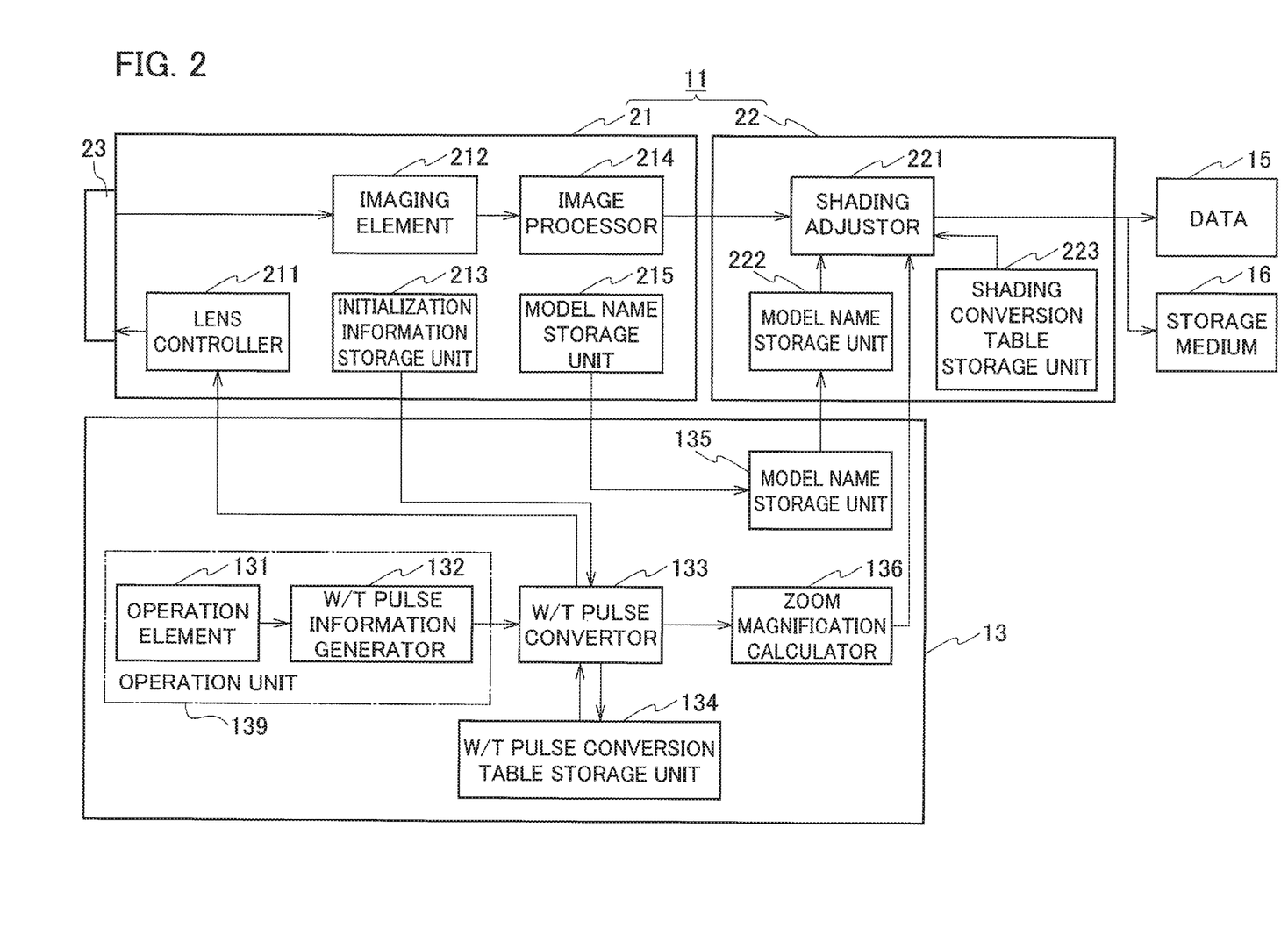
FIG. 2 is a block diagram illustrating a detailed constitution of a camera, a display control device, and an image quality adjustor of the display control system according to the embodiment.

FIG. 2 is a block diagram illustrating a detailed constitution of the imaging device 11 and the display control device 13. In FIG. 2, one of three imaging devices 11a, 11b, 11c illustrated in FIG. 1 is illustrated as the imaging device 11. Illustrations of the other two imaging devices are omitted. As illustrated in FIG. 2, the camera 21 includes a lens controller (zoom magnification changer) 211 that operates the lens 23 to change its zoom magnification at the time of taking an image, an imaging element 212 that acquires an image condensed by the lens 23 and converts the image to image data, and an image processor 214 that applies high-quality image processing on the image data outputted from the imaging element 212. The image processor 214 can be composed of, for example, an ISP (Image Signal Processor). Furthermore, the camera 21 includes an initialization information storage unit 213 that stores initial data of the camera 21, and a model name storage unit 215 that stores the model name of the camera 21.

The display control device 13 includes an operation unit 139 that accepts an input operation by an operator, a W/T pulse conversion table storage unit 134, a W/T pulse convertor 133, a model name storage unit 135, a zoom magnification calculator 136. Here, it is noted that alphabet "W" in "W/T" represents "WIDE (wide angle side)" and alphabet "T" represents "TELE (telephoto side)". The operation unit 139 includes an operation element 131 and a W/T pulse information generator 132.

Figure 3:
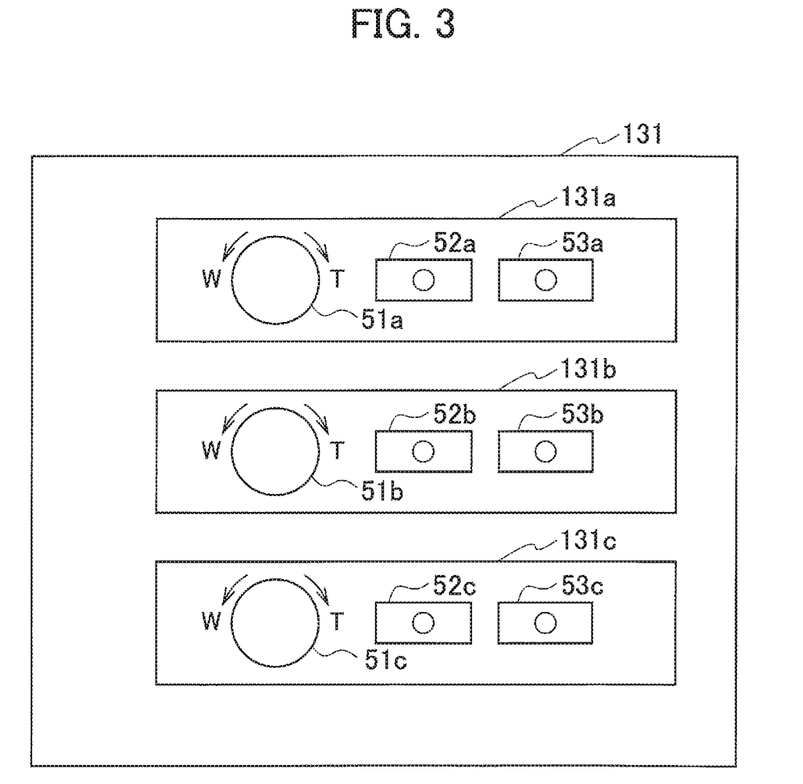
FIG. 3 is an explanatory diagram illustrating a detailed constitution of an operation element illustrated in FIG. 2.

As illustrated in FIG. 3, the operation element 131 includes magnification setting dials 51 (51a, 51b, 51c) for setting the zoom magnifications for the respective cameras 21a, 21b, 21c, pan operation switches 52 (52a, 52b, 52c) for controlling the pan angles, and tilt operation switches 53 (53a, 53b, 53c) for controlling the tilt angles. That is, the operation element 131 accepts an operator's operation of setting the zoom magnifications and an operator's operations of both panning and tilting.

Each magnification setting dial 51 is composed of, for example, a return-type dial whose rotation from its reference position to the left allows the zoom magnification to be changed to a WIDE direction and whose rotation from the reference position to the right allows the zoom magnification to be changed to a TELE Direction. Also, as the rotation angle from the reference position increases, the changing rate of the zoom magnification increases. Accordingly, for example, when it is desired to increase the zoom magnification, an operator may first rotate the dial to the right greatly to cause the enlargement ratio to be changed rapidly and subsequently, the operator may make the rotation angle gradually smaller, thereby allowing a fine adjustment of the zoom magnification. If the dial is released from an operator's hand on completion of the rotating operation, then the magnification setting dial 51 is returned to the reference position by its returning function automatically, so that the so-established zoom magnification will be maintained.

Each of the pan operation switches 52 and the tilt operation switches 53 is composed of, for example, a joystick which allows the pan or tile angle to be remotely controlled in response to the operating direction and amount of the joystick.

The W/T pulse information generator 132 generates and outputs a control signal (i.e. a first control signal) representing a control amount corresponding to the operation amount inputted through the operation element 131. Specifically, the W/T pulse information generator 132 generates and outputs a pulse signal having the number of pulses corresponding to the operation amount inputted through the operation element 131. This pulse signal will be referred to as "input pulse signal" later. The pulse signal is a signal where ON and OFF states are repeated periodically. As the rotation angle from the reference position of the dial gets increased, the frequency of the pulse signal (the number of pulses per unit time) becomes larger, and the change rate of the zoom operation becomes increased. The operation amount is determined by the rotation angle of the dial from the reference position and a period when the rotation angle is maintained.

The model name storage unit 135 stores the respective model names of the cameras 21a, 21b, 21c, for example, as IDs for the respective models.

The W/T pulse convertor 133 converts the number of pulses of the pulse signal outputted from the W/T pulse information generator 132 into a pulse signal having the number of pulses for controlling the zoom magnification of the camera 21 (this pulse signal will be referred to as "reference pulse signal" later). Specifically, it is performed to convert the number of pulses of the pulse signal so as to uniformize variations in the zoom magnification of respective cameras 21a, 21b, 21c with respect to a predetermined operation amount of each of the magnification setting dials 51a, 51b, 51c. As such, the converted pulse signal is outputted to the lens controller 211.

Suppose, for example, when the operation amount of the magnification setting dial 51a of the camera 21a is N1, the number of pulses of the input pulse signal outputted from the W/T pulse information generator 132 is M1. Then, when the operation amount of the magnification setting dial 51b of the camera 21b is N1 as well, the number of pulses of the input pulse signal outputted from the W/T pulse information generator 132 becomes M1 similarly. In this case, if the input pulse signals having the same number of pulses are outputted to the camera 21a and the camera 21b (if the conversion processing of the W/T pulse convertor 133 is not performed), the zoom magnification changes, on the side of the camera 21a, with a change amount (e.g. K1) corresponding to the pulse number M1.

Here, if the camera 21b were the same model as the camera 21a, the zoom magnification would change, on the side of the camera 21b, with the change amount K1 with respect to the pulse number M1. However, if the camera 21b were of a different type from the camera 21a, the zoom magnification of the camera 21b would change with a change amount (e.g. K2) corresponding to the pulse number M1 since the change amount of the zoom magnification for one pulse at the camera 21b is different from that at the camera 21a. That is, as the zoom magnification of the camera 21a changes by K1 while the zoom magnification of the camera 21b changes by K2 in spite of operating two magnification setting dials 51a, 51b by the same operation amount N1, an operator may have a sense of discomfort because of lack uniformity in their change amounts.

Therefore, in the embodiment, the W/T pulse convertor 133 is configured so as to convert the input pulse signals into the reference pulse signals according to the models of the respective cameras, thereby performing a process of allowing respective variations in the zoom magnification of the cameras 21a, 21b, 21c corresponding to a predetermined operation amount of the magnification setting dial 51 to coincide with each other.

For this reason, the W/T pulse conversion table storage unit 134 stores a W/T pulse conversion table having data (conversion coefficients) for converting the number of pulses of the pulse signal with respect to each model of the respective cameras 21. Thus, in operation, when the input pulse signal is outputted from the W/T pulse information generator 132, the W/T pulse convertor 133 converts the number of pulses with reference to the W/T pulse conversion table and outputs the reference pulse signal to the relevant camera 21.

As defined above, the "reference pulse signal" coincides with the second control signal produced as a result that the W/T pulse convertor (control amount convertor) 133 has converted the control amount of the first control signal so as to uniformize variations in the zoom magnification of respective cameras, with respect to a predetermined operation amount of the operation element 131.

Based on the number of pulses of the reference pulse signal converted by the W/T pulse convertor 133, the zoom magnification calculator 136 calculates the zoom magnification of the camera 21 and further transmits the calculated zoom magnification data to the image quality adjustor 22.

The display control device 13 may be formed by, for example, an integrated computer including a central processing unit (CPU), a RAM, a ROM, and a storage unit such as a hard disk.

The image quality adjustor 22 includes a shading adjustor (image quality corrector) 221, a model name storage unit 222, and a shading conversion table storage unit (correction value storage unit) 223.

The model name storage unit 222 stores the model name of each camera 21 transmitted from the model name storage unit 135 of the display control device 13.

The shading conversion table storage unit 223 stores various threshold values and various correction values for performing the shading correction corresponding to the model of each camera 21.

Based on the model of each camera 21 and its zoom magnification, the shading adjustor 221 acquires various types of data used for the shading correction from the shading conversion table storage unit 223 and performs the shading correction of the image data outputted from the image processor 214. As a result, it becomes possible to perform the appropriate shading correction according to the model of the camera 21 and the zoom magnification, thereby allowing the image to be converted into a clear image without density unevenness. The shading adjustor 221 has a function as the image quality corrector.

Figure 4:
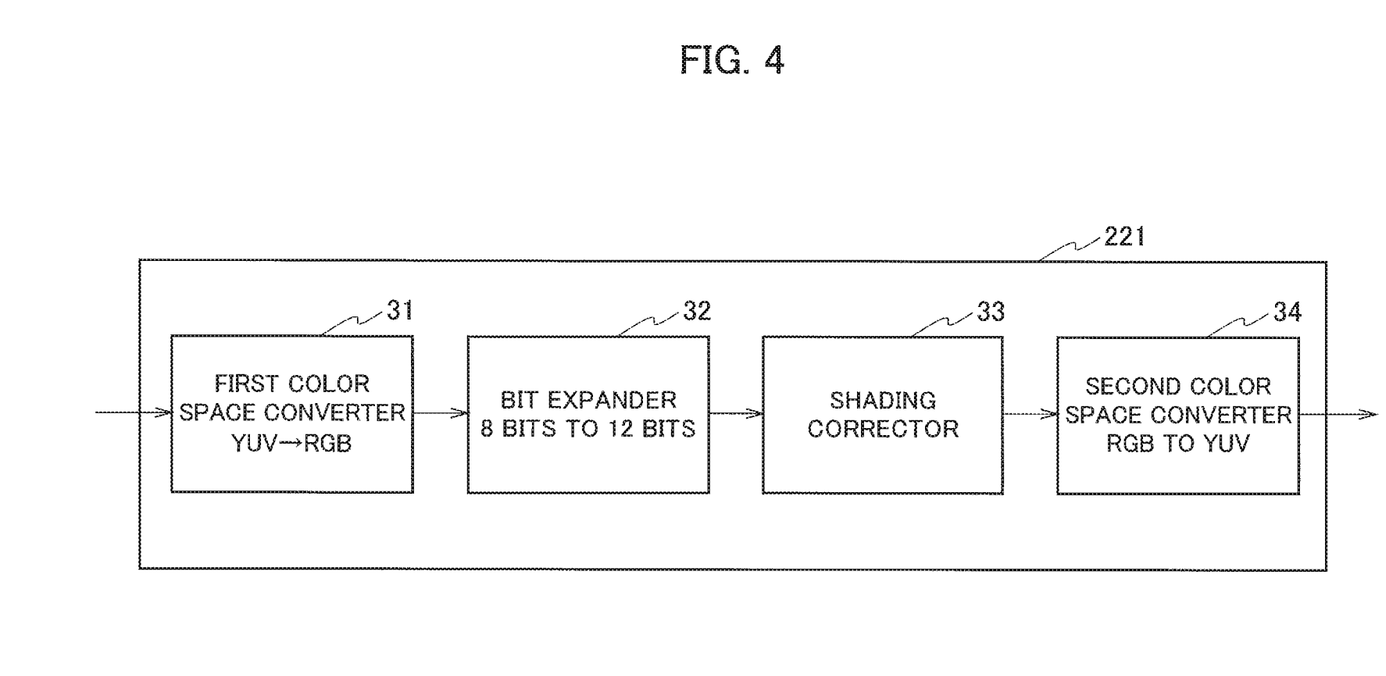
FIG. 4 is a block diagram illustrating a detailed configuration of a shading adjustor according to the embodiment.

FIG. 4 is a block diagram illustrating a detailed configuration of the shading adjustor 221. The shading adjustor 221 includes a first color space converter 31 for converting YUV signals into RGB signals, a bit expander 32 for converting image data from 8 bits to 12 bits, a shading corrector 33 for performing the shading correction, and a second color space converter 34 for converting shading-corrected RGB image data into YUV image data.

The image data outputted from the image processor 214 is formed by a YUV signal. The YUV signal represents color information in the form of a combination of Y: a luminance signal, U: a difference between the luminance signal and a blue-color component, and V: a difference between the luminance signal and a red-color component. Since this YUV signal is divided into the luminance signal whose variation can be sensitively felt by human eyes and a color difference signal whose variation cannot be felt by human eyes sensitively, the above image data employs a data form utilizing characteristics of the human eyes.

The image after the shading correction by the shading adjustor 221 is outputted to the monitor 15 and the storage medium 16. The monitor 15 displays the image on the screen. The storage medium 16 is formed by such as a USB memory and an SD card to record the image data.

Figure 5:
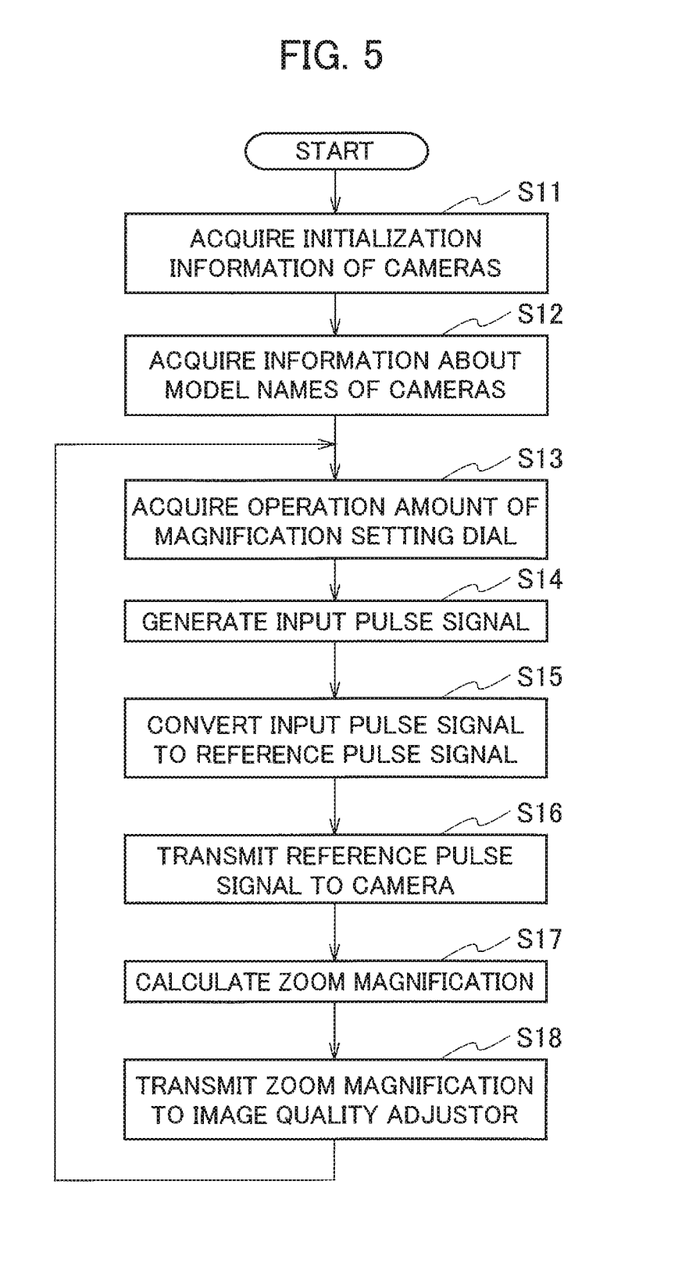
FIG. 5 is a flowchart illustrating a processing procedure of the display control device according to the embodiment.
Figure 6:
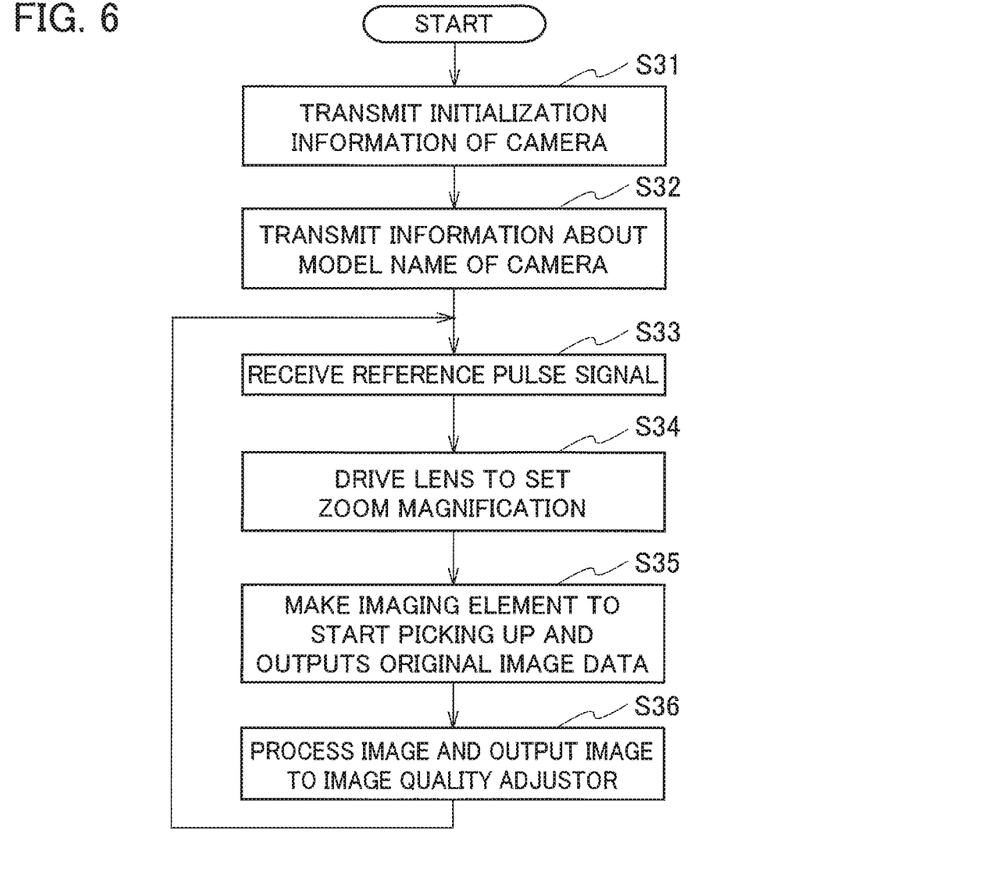
FIG. 6 is a flowchart illustrating a processing procedure of the camera according to the embodiment.
Figure 7:
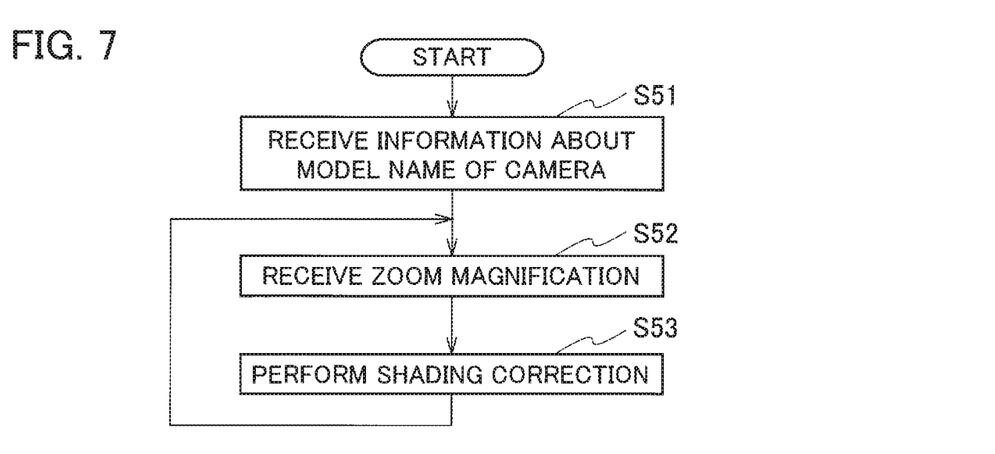
FIG. 7 is a flowchart illustrating a processing procedure of the image quality adjustor according to the embodiment.

Next, the operation of the display control system according to the embodiment will be described with reference to the flowcharts illustrated in FIGS. 5 to 7.

First, the processing procedure of the display control device 13 will be described with reference to FIG. 5.

At step S11, the display control device 13 acquires the initialization information of the respective cameras 21 (i.e. information of the cameras 21 when they are powered ON). Based on this information, it is recognized that the lens 23 of each camera 21 is in the reference position and the zoom magnification has an initial value.

At step S12, the display control device 13 acquires the information about the model names of the respective cameras 21 by its communication with them. The information about the model names is stored in the model name storage unit 135.

At step S13, it is performed to accept an operator's input of the magnification setting dial 51 and detect the operation amount of the magnification setting dial 51.

At step S14, the W/T pulse information generator 132 generates and outputs the input pulse signal having the number of pulses according to the operation amount of the magnification setting dial 51.

At step S15, the W/T pulse convertor 133 converts the input pulse signal outputted from the W/T pulse information generator 132 into a reference pulse signal with reference to the model names of the cameras stored in the model name storage unit 135 and the conversion table stored in the W/T pulse conversion table storage unit 134.

At step S16, the reference pulse signal is outputted to the lens controller 211 of the camera 21.

At step S17, the zoom magnification calculator 136 calculates the zoom magnification of the camera 21 on the basis of the reference pulse signal. Then, at step S18, the data of the calculated zoom magnification is outputted to the image quality adjustor 22. Thereafter, the process returns to step S13.

As described above, in the display control device 13, when the magnification setting dial 51 is operated by the operator, the input pulse signal outputted according to the operation amount is converted into the reference pulse signal and further outputted to each camera 21.

Next, the processing procedure of the camera 21 will be described with reference to the flowchart illustrated in FIG. 6.

At step S31, the camera 21 outputs the initialization information of the camera 21 stored in the initialization information storage unit 213 to the display control device 13.

At step S32, the camera 21 outputs the information about the model name of the camera 21 stored in the model name storage unit 215 to the display control device 13.

At step S33, the lens controller 211 receives the reference pulse signal outputted from the W/T pulse convertor 133.

At step S34, the lens controller 211 controls to drive the lens 23 so that the zoom magnification of the camera 21 becomes a desired magnification. As the input pulse signal generated according to the operation amount of the magnification setting dial 51 (see FIG. 3) is converted into the reference pulse signal by the W/T pulse convertor 133, the lens controller 211 drives the lens 23 in accordance with the number of pulses of the reference pulse. As described above, the W/T pulse convertor 133 converts the input pulse signal (the control amount of the control signal outputted from the operation unit) into the reference pulse signal so as to uniformize variations in the zoom magnification of respective cameras 21 (21a, 21b, 21c) with respect to a predetermined operation amount of each magnification setting dial 51 (51a, 51b, 51c).

As a result, since respective variations in the zoom magnification of respective cameras 21 (21a, 21b, 21c) with respect to a predetermined operation amount of each magnification setting dial 51 (51a, 51b, 51c) are uniformized throughout the cameras 21 (21a, 21b, 21c), it is possible to maintain the consistency of the magnification operation by an operator, thereby allowing the zoom magnification of respective cameras to be operated by an operator without an uncomfortable feeling.

At step S35, the imaging element 212 picks up an image focused by the lens 23 and outputs original image data. Further, at step S36, the image processor 214 processes the original image data so as to have a high resolution and outputs it to the image quality adjustor 22. Subsequently, the process returns to step S33.

In this way, the camera 21 changes the zoom magnification according to the operation amount of the magnification setting dial 51 of the display control device 13 to take a surrounding image. Then, the camera 21 changes so-acquired original image data to new image data having a high resolution and further outputs this image data to the image quality adjustor 22.

Next, the processing procedure of the image quality adjustor 22 will be described with reference to the flowchart illustrated in FIG. 7.

First, at step S51, the image quality adjustor 22 receives the information about the model name of the camera 21 from the display control device 13 and stores the received information in the model name storage unit 222.

At step S52, the shading adjustor 221 receives the information about the zoom magnification transmitted from the zoom magnification calculator 136.

At step S53, the shading adjustor 221 performs the shading correction to the image data outputted from the image processor 214 with reference to the shading conversion table stored in the shading conversion table storage unit 223. The threshold value and various correction values used for the shading correction vary depending on the model name of the camera and zoom magnification. Thus, based on the model name of the camera 21 stored in the model name storage unit 222 and the zoom magnification transmitted from the zoom magnification calculator 136, it is carried out to set a threshold value and various correction values for the shading correction, thereby performing the shading correction. Owing to the execution of shading correction using this threshold value and various correction values, it is possible to generate image data regardless of the model of the camera. Thereafter, the process returns to step S52.

In this way, the display control system according to the embodiment can achieve the following effects.

(1) Each of the cameras 21 is provided with the magnification setting dial (operation element) 51. When an operator manipulates the operation element, the W/T pulse information generator 132 operates the magnification setting dial 51 outputs an input pulse signal (control signal) having a pulse frequency (control amount) corresponding to the operation amount of the magnification setting dial 51. Then, the W/T pulse convertor (control amount convertor) 133 converts the input pulse signal into a reference pulse signal so as to uniformize variations in the zoom magnification of respective cameras with respect to a predetermined operation amount of the magnification setting dial 51. That is, as the variations in the zoom magnification of respective cameras with respect to an operator's operation amount of the magnification setting dial 51 coincide with each other, the operator can operate the zoom magnifications of the plurality of cameras 21 without an uncomfortable feeling. Thus, even in a situation with different models of cameras, when generating an image (e.g. case of switching a presently-displayed image to another one), the operator can carry out image generation of a new image without an uncomfortable feeling.

(2) The display control device 13 includes the W/T pulse conversion table storage unit 134 and converts the input pulse signal into the reference pulse signal with reference to the conversion table stored in the W/T pulse conversion table storage unit 134. Thus, it is possible to convert the pulse signal without executing complicated arithmetic processing, thereby allowing a reduction of the burden of calculation.

(3) Since the operation unit 139 employs a pulse signal where ON and OFF states of the control signal are repeated periodically, and the W/T pulse convertor 133 converts the pulse frequency of the input pulse signal to generate the reference pulse signal, the conversion of the control signal can be accomplished with ease.

(4) Each of the cameras 21 is provided with the image quality adjustor 22, and the shading adjustor 221 of the image quality adjustor 22 establishes the threshold value and the respective correction values for shading correction on the basis of the model name of the relevant camera 21 and its zoom magnification. Thus, it is possible to avoid the occurrence of a problem that the images of the respective cameras 21 after the shading correction are different from each other in the viewpoint of image quality, thereby allowing an image having stable image quality to be generated.

(5) Since the image quality adjustor 22 performs the shading correction using the threshold value and various correction values stored in the shading conversion table stored in the shading conversion table storage unit 223, it is possible to perform shading correction of each image stably.

Although the embodiment provides a unit to perform shading correction as an example of the image quality adjuster, the present application is not limited to this and therefore, it may employ a unit provided with the other image quality adjustment function. Further, although the embodiment employs the example of performing shading correction after converting a YUV image into a RGB image, it is also possible to perform the shading correction without changing the YUV image.

Although the embodiment has been described above, it should not be understood that the description and drawings constituting a part of this disclosure do limit the present application. From this disclosure, a variety of alternative embodiments, examples and operational techniques will be apparent to those skilled in the art.

For example, in the above-described embodiment, the operation element is provided for each camera. In a modification, however, the operation elements may be replaced by a single operation element and a selecting switch and additionally, the display control device may be configured so as to assign a camera to he operated, through the selecting switch. Still further, although the W/T pulse information generator 132 actually generates a pulse signal in the illustrated embodiment, the display control device may be configured so as to transmit the information about a pulse signal (e.g. the frequency of the pulse signal, the number of pulses within a predetermined time, etc.) to the W/T pulse convertor 133 that converts to a pulse signal corresponding to the model of each camera, based on the transmitted information.

What is claimed is:

1. A display control device for controlling displaying of images taken by a plurality of cameras each having a function of changing a zoom magnification, comprising:
    an operation unit including a plurality of operation elements, each of the operation elements provided for a corresponding camera to accept an operator's operation of setting the zoom magnification of the corresponding camera, the operation unit being configured to output a control amount of a first control signal corresponding to an operation amount of each of the operation elements; and
    a control amount convertor configured to convert the control amount of the first control signal to a control amount of a second control signal so as to uniformize variations in the zoom magnification of respective cameras with respect to a predetermined operation amount of each of the operation elements, and output the second control signal to a corresponding camera, the control amount convertor including a conversion table storage unit storing conversion data for converting the control amount of the first control signal to the control amount of the second control signal of each of the cameras.

2. The display control device of claim 1, wherein the conversion table storage unit stores a conversion coefficient for converting the control amount of the first control signal to the control amount of the second control signal.

3. The display control device of claim 1, wherein
    each of the first control signal and the second control signal is a pulse signal where an ON-state and an OFF-state are repeated periodically, and
    each of the control amount of the first control signal and the control amount of the second control signal is formed by a frequency of the pulse signal.

4. A display control system, comprising:
    a plurality of cameras each having a function of changing a zoom magnification; and
    a display control device for controlling displaying of images taken by the cameras, wherein:
    each of the cameras comprises a zoom magnification changer;
    the display control device comprises:
        an operation unit including a plurality of operation elements, each of the operation elements provided for a corresponding camera to accept an operator's operation of setting the zoom magnification of the corresponding camera, the operation unit being configured to output a control amount of a first control signal corresponding to an operation amount of each of the operation elements; and
        a control amount convertor configured to convert the control amount of the first control signal to a control amount of a second control signal so as to uniformize variations in the zoom magnification of respective cameras with respect to a predetermined operation amount of each of the operation elements, and output the second control signal to the zoom magnification changer of a corresponding camera, the control amount convertor including a conversion table storage unit storing a conversion table configured to store a conversion coefficient for converting the control amount of the first control signal to the control amount of the second control signal of each of the cameras; and the zoom magnification changer is configured to change the zoom magnification corresponding to the control amount of the second control signal.

5. The display control system of claim 4, further comprising an image quality corrector configured to perform shading correction to images taken by the respective cameras.

6. The display control system of claim 5, wherein the image quality corrector further comprises a correction value storage unit configured to store a correction value for the shading correction with respect to each model of the cameras.

* * * * *